(12) United States Patent
Denson

(10) Patent No.: US 12,055,318 B2
(45) Date of Patent: Aug. 6, 2024

(54) OVERHEAD AIR FILTRATION SYSTEM

(71) Applicant: Bernard Denson, Hastings, FL (US)

(72) Inventor: Bernard Denson, Hastings, FL (US)

( * ) Notice: Subject to any disclaimer, the term of this patent is extended or adjusted under 35 U.S.C. 154(b) by 861 days.

(21) Appl. No.: 17/096,569

(22) Filed: Nov. 12, 2020

(65) Prior Publication Data

US 2022/0146125 A1 May 12, 2022

(51) Int. Cl.
| | |
|---|---|
| *E04H 7/22* | (2006.01) |
| *B01D 19/02* | (2006.01) |
| *B01D 46/00* | (2022.01) |
| *B01D 46/46* | (2006.01) |
| *B01D 46/62* | (2022.01) |
| *B01D 53/85* | (2006.01) |
| *F24F 8/10* | (2021.01) |
| *F25D 17/00* | (2006.01) |
| *F24F 110/50* | (2018.01) |

(52) U.S. Cl.
CPC ............ *F24F 8/10* (2021.01); *B01D 46/0005* (2013.01); *B01D 46/46* (2013.01); *B01D 46/645* (2022.01); *B01D 53/85* (2013.01); *B01D 2279/50* (2013.01); *F24F 2110/50* (2018.01)

(58) Field of Classification Search
CPC ................ B08B 15/02; B01D 46/0028; B01D 46/0026; F24F 3/1603

USPC ........ 55/273, 319; 62/179; 96/121, 123–124; 454/177, 187

See application file for complete search history.

(56) References Cited

U.S. PATENT DOCUMENTS

| | | | |
|---|---|---|---|
| 4,961,763 A | 10/1990 | Thompson | |
| 5,130,091 A | 7/1992 | Saceman | |
| 5,724,701 A * | 3/1998 | Jones | B01D 46/66 15/319 |
| 6,197,094 B1 | 3/2001 | Thofelt | |
| 9,010,019 B2 | 4/2015 | Mittelmark | |
| 10,336,162 B2 | 7/2019 | Sawyer | |
| 2002/0139251 A1 | 10/2002 | Simmons | |
| 2008/0250800 A1* | 10/2008 | Wetzel | F24F 12/006 62/179 |
| 2009/0064858 A1 | 3/2009 | Mazzanti | |
| 2010/0000413 A1 | 1/2010 | Turner | |
| 2012/0026947 A1 | 3/2012 | Kruglick | |
| 2015/0375602 A1 | 12/2015 | Fields | |
| 2017/0014876 A1* | 1/2017 | Moon | B23K 9/325 |
| 2017/0273256 A1 | 9/2017 | Hutzel | |
| 2018/0133084 A1* | 5/2018 | Kirschman | F24F 3/00 |

* cited by examiner

*Primary Examiner* — Monzer R Chorbaji
(74) *Attorney, Agent, or Firm* — Lawrence J. Gibney

(57) ABSTRACT

It is advisable to remove harmful pathogens by filtering the air in a space using a set of filters over intakes. As the air travels through ductwork for that purpose the filters remove harmful pathogens. Harmful pathogens may include viruses or bacteria to name a few. Other pathogens may also be removed depending on the filtration media. This device is designed to be portable and caster wheels that can be locked have been placed on the air handler of the device.

5 Claims, 2 Drawing Sheets

OVERHEAD AIR FILTRATION SYSTEM

BACKGROUND OF THE INVENTION

A. Field of the Invention

This relates to filtering the air, specifically harmful particulates made through viruses or other disease-carrying pathogens. This device will work with existing air-conditioning or ventilation systems in a building. It will not take the place of a ventilation or air conditioning system but will be a complement to the ventilation system to rid the environment of airborne pathogens to include viruses, bacteria and other harmful substances. The unit is placed at a height above the occupants of a space and should not be noticed by the occupants. It is also designed to be portable.

B. Prior Art

There are many prior art references for air purification systems. Most of these systems operate to remove harmful particles using plants of other media. These systems also do not use forced air to circulate the air within the system.

A representative example of this type of device can be found at Thompson, U.S. Pat. No. 4,961,763. In this device air is taken form the space and forced downward through a plant filter. Another example of a system that uses a plant-based filtration system can be found at Saceman, U.S. Pat. No. 5,130,091. In this application no plants are used and the air is forced upward into the device through a set of specifically designed filters that remove pathogens.

Another type of device that can be found in the prior art can be found at Mazzanti, U.S. Patent Publication 2009/0064858. This device is specifically designed to purify the air as it removes pollution using water and a biomass filtration system. The current application does not depend on use of water or biomass and this device is not being used to remove pollution but instead is being used to remove harmful pathogens.

Another example from the prior art can be found at Turner, U.S. Publication 2010/0000413. This device plugs into the wall and a fan with an impeller forces air through a filtering medium. The current application specifically targets pathogens and uses a series of filter to purify the existing atmosphere. Additionally, the present device is designed to be placed above the occupants of a space. No such specific placement is taught by the Turner reference.

Other examples exist in the prior art but none teach the uses of filters for pathogens that are placed in the space above the occupants in a room.

BRIEF SUMMARY OF THE INVENTION

The device will consist of an air handler unit with an intake and a discharge and ductwork that is placed above the occupants of a space. A small vacuum will be created in the duct work and force the air through the ductwork and into the air handler unit. The system will operate using forced air through the system. There will be a fan which will circulate air throughout the system. Ductwork will be connected to the air handler unit which can be configured to any shape desired by the end user or customer.

This duct work will be joined using a variety of different ways to include bolts and nuts or screws or other means of attachment. No one way is claimed as part of this invention.

Inside the duct work will be a series of intakes, which will have a series of filters over each intake that will help purify the air by removing any airborne pathogens. These pathogens may include bacteria or viruses or other harmful substances.

Separate fans within the ductwork will create a slight vacuum so that the air will flow from the space and through the filters. The blower inside the air handler will also create a slight vacuum so that the flow of the air goes from the interior of the room through the filters and into the air handler unit through its discharge.

The purpose of the filters is to remove harmful pathogens form the air inside a space. The filters can be easily removed and cleaned and re-installed. A variety of types of filters may be used including High Efficiency Particulate Air (HEPA) filters or filters that use microbes may be used.

Once the air travels through the ductwork it is then discharged back into the space. The system is not intended to remove moisture from the air and should not interfere with the operation of the air conditioning or heating unit that is used in the space.

NUMBERING REFERENCES

Figure 1:
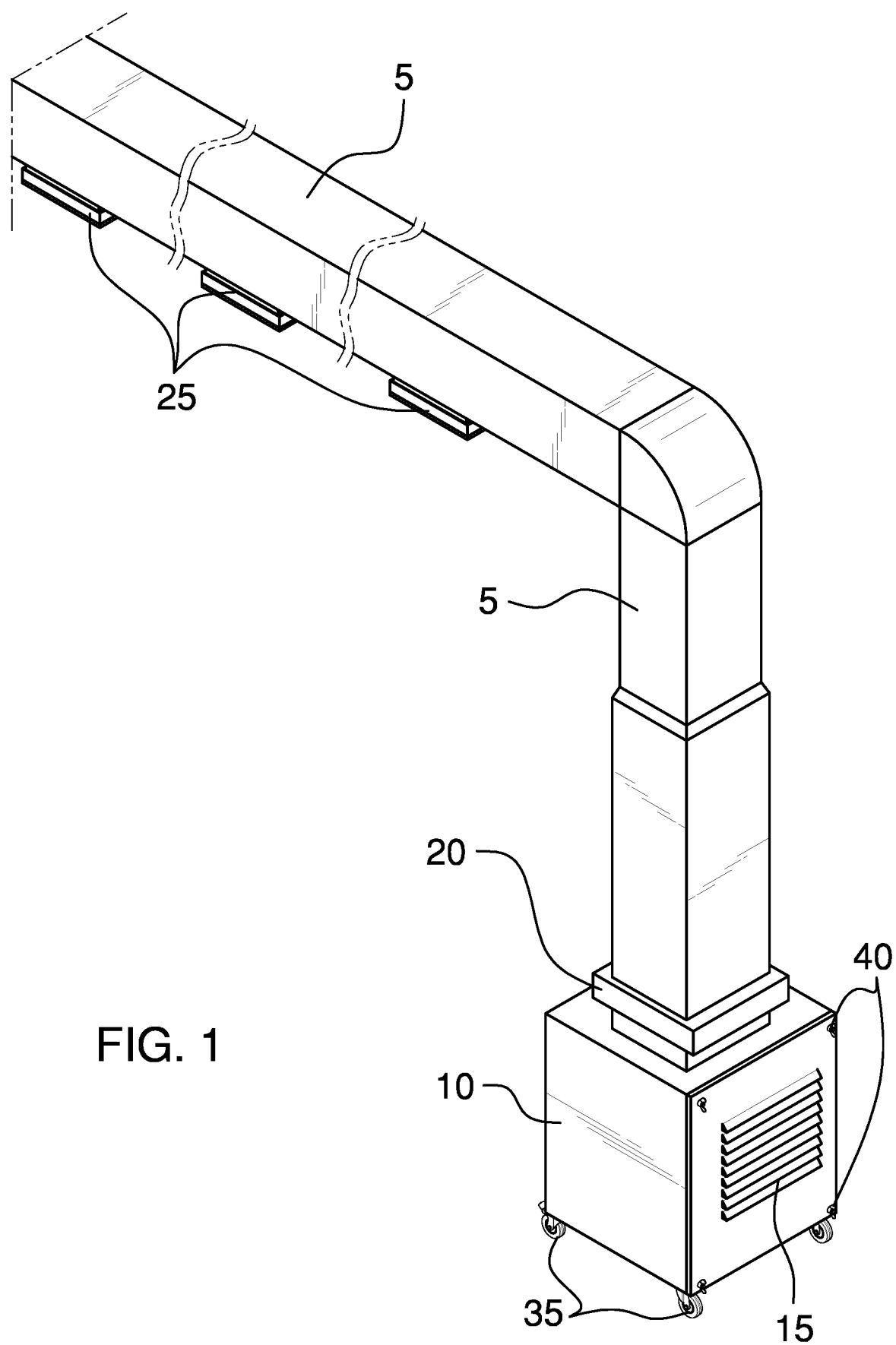
FIG. 1 is a prospective view of the system.
Figure 2:
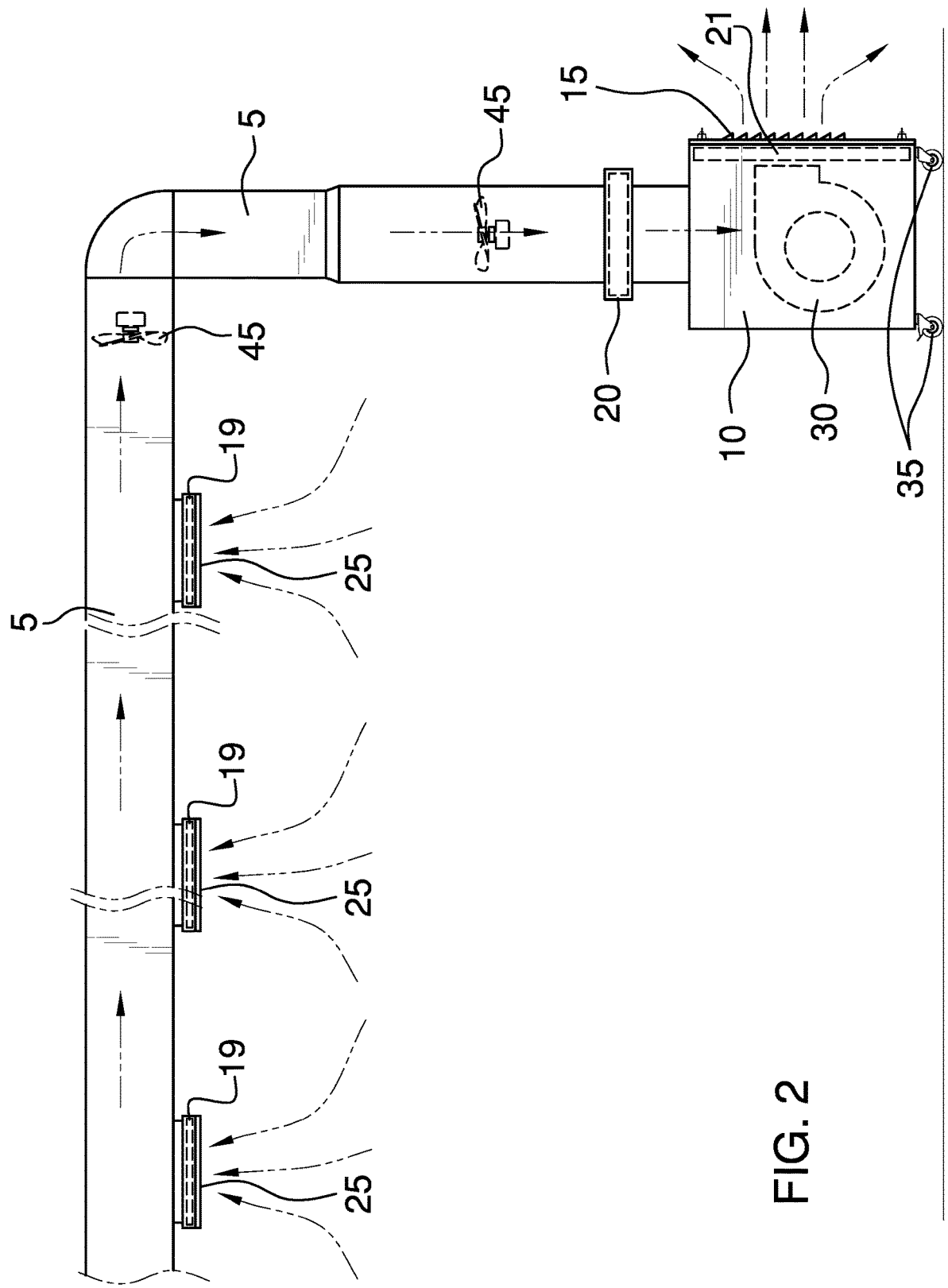
FIG. 2 is a side view of the system.

5 Ductwork
10 Air Handler
15 Air Discharge
19 Intake Filter
20 Ductwork Filter
21 Exhaust Filter
25 Intake
30 Exhaust Fan
35 Caster Wheels
40 Exhaust Panel Connection
45 Internal Fan

DETAILED DESCRIPTION OF THE EMBODIMENTS

The system will work in conjunction with the existing air conditioning or heating system that is found in warehouses, classrooms, retail establishments, bars and many other spaces. The system will be placed in the space above or over the occupants of the room. The system will force air from the interior of the room through a set of intakes 25 that are overhead and facing downward in the space in which the system is installed; the intakes will be positioned so that they face in a downward alignment with the occupants below. The height of the ductwork can be adjusted during the assembly process depending on the needs of the user.

Separate intake filters 19 will be placed over the intakes 25. The design of the intakes 25 will be in the shape to allow the free flow of air through the intake. Many different designs of vents over the intakes can be used depending of the needs of the customer or end user. The filters can be a variety of filters including HEPA (high-efficiency particulate air) filters or filters with microbes or HEPA and carbon filters may also be used. As filters improve, other types of filters may also be used.

The air flow will travel from the space and through the intake filters 19. The intake filters 19 are designed to trap particles such as bacteria, viruses, spores, fungus, and other harmful particles and remove those particles from the environment. Each of the intake filters can be washed or cleaned and then replaced into the intakes 25. The intakes 25 are positioned on the underside of the duct work 5 but far enough away from the inhabitants of the space to be largely unnoticed. A separate intake filter 19 will be positioned for each intake 25.

Ductwork 5 is assembled in whatever configuration is needed to accommodate the needs of the end user. The means to connect the sections of ductwork may be varied and no one means to connect the sections is being claimed. The air passes through the intake or vent 25 and passes through the intake filter 19 before it enters the ductwork. A slight vacuum is created in the duct 5 by a series of internal fans 45. The vacuum will force the air in the space including any harmful particles through the intake 25 and past the intake filter 19 and into the ductwork 5. Vacuum seals (not depicted) are placed around the sections of the ductwork to maintain the vacuum as the air circulates through the system.

The air then travels through the ductwork and through another ductwork filter 20. The air will then travel into the air handler 10. An exhaust fan 30 in the air handler will force the air past an exhaust filter 21 and through the exhaust vent.

The intake filters 19, the ductwork filter 20 and exhaust filter 21 are all designed to purify the air from the room and remove any harmful particles and then return the air back into the space. Additionally, the intake filters 19, the ductwork filter 20 and exhaust filter 21 are all designed to be washed or cleaned and then returned to their respective location. Depending on the needs of a particular customer, the same type of filter may be used for each of the filter or different type filters may be used.

The air handler will have an exhaust fan 30, which forces the air past the exhaust filter 21 and back into the space.

This system is not designed to remove humidity from the air or control the temperature of the air in the space so it will not interfere with the operation of the heating and air conditioning systems that are already installed in the space. The system should also be designed so that it is efficient in terms of its use of energy and quiet so that it does not disturb the activities of the occupant(s) of the space.

The system is designed to turn on and off depending on the needs of the consumer and is not intended to operate continuously. Components such as motion sensors to activate and deactivate the system are contemplated as well as relays that will enable the end user to install a delay in the staring and stopping of the exhaust fan and other components are also contemplated. In order to preserve the mechanical equipment, especially the exhaust fan a means to cool the exhaust fan to prevent overheating may also be installed.

Caster wheels 35, which can be locked in placed, if desired, are placed on the bottom of the air handler to enable the user to move the device, if desired by the user.

While the embodiments of the invention have been disclosed, certain modifications may be made by those skilled in the art to modify the invention without departing from the spirit of the invention.

The invention claimed is:

1. An overhead air filtration system that is comprised of:
   a. ductwork;
   wherein the ductwork is assembled;
   wherein the height of the ductwork is adjustable;
   wherein a plurality of vacuum seals will be placed on the sections of the ductwork;
   b. a plurality of intakes;
   wherein the plurality of intakes are positioned in a downward alignment relative to the space;
   c. a plurality of intake filters;
   wherein a separate intake filter will be placed on each of the plurality of intakes;
   d. a plurality of internal fans;
   wherein the plurality of internal fans are placed inside the ductwork;
   wherein the plurality of internal fans will create a vacuum in the ductwork;
   e. a ductwork filter;
   wherein the ductwork filter is placed in the ductwork proximate to the air handler;
   f. air handler;
   wherein the air handler provides a connection point for the ductwork;
   g. an exhaust fan;
   h. an exhaust filter;
   wherein the exhaust filter is positioned proximate to the exhaust fan;
   i. a motion sensor;
   j. a delay switch;
   k. a plurality of caster wheels.

2. The overhead air filtration system as described in claim 1 wherein the filter is a high-efficiency particulate filter.

3. The overhead air filtration system as described in claim 1 wherein the caster wheels can lock in place.

4. The overhead air filtration system as described in claim 1 wherein the filter is a filter treated with microbes.

5. The overhead air filtration system as described in claim 1 wherein the filters can be washed.

* * * * *